United States Patent Office 3,663,482
Patented May 16, 1972

3,663,482
AQUEOUS SUSPENSION POLYMERISATION
PROCESS FOR VINYL HALIDES
Geoffrey James Gammon, Ashford, England, assignor to The British Petroleum Company Limited, London, England
No Drawing. Filed Mar. 13, 1970, Ser. No. 19,477
Claims priority, application Great Britain, Mar. 21, 1969, 14,929/69
Int. Cl. C08f 1/11
U.S. Cl. 260—17 R    15 Claims

ABSTRACT OF THE DISCLOSURE

This invention relates to a process for the production of vinyl or vinylidene halide polymers by aqueous suspension polymerisation of the monomers in the presence of a free radical initiator and using a sparingly soluble inorganic phosphate suspending agent in conjunction with a metal alkyl phosphate extender. The phosphate suspending agents are suitably the hydroxy-apatities and the extender is suitably an alkali metal alkyl phosphate, the alkyl group having from 2 to 20 carbon atoms.

---

This invention relates to improvements in or relating to polymerisation and copolymerisation of vinyl halides in aqueous suspension.

Processes for the polymerisation of olefinically unsaturated compounds in aqueous suspension are known. Such processes generally employ suspending agents and wetting agents in addition to polymerisation catalysts of the free-radical type.

The product formed in an aqueous suspension polymerisation process is produced in the shape of fine particles. It is the function of the suspending agent to maintain the polymerising monomer in suspension, to prevent or reduce the tendency of polymer particles to agglomerate, and to control particle form.

Conventional suspending agents used in the aqueous suspension polymerisation and copolymerisation of vinyl chloride are organic water soluble polymeric materials which include cellulose ethers, for example methyl cellulose, hydroxyethyl cellulose, hydroxypropyl methyl cellulose, ethyl hydroxyethyl cellulose and such compounds as polyvinyl alcohol, gelatin, agar-agar, starch, partially hydrolysed polyvinyl acetates and copolymerisation products of vinyl acetate and maleic anhydride or maleic acid.

Similarly, many wetting agents or extenders are known. It is the function of an extender to aid or enhance the dispersion properties of the suspending agents. Known extenders include anionic surface active agents such as sodium caproate and sodium oleate; organic sulphates and sulphonates such as long chain alkyl sulphates and sulphonates.

Aqueous suspension polymerisation processes employing conventional suspending agents for vinyl halides produce the polymer in the form of fine particles. When a thin section of such a particle is viewed by phase contrast microscopy, a "pericellular membrane" or external "skin" is seen.

It is believed that this external membrane around each suspension polymer particle has a deleterious effect on the polymer properties. Vinyl chloride-based polymers which are free from this membrane, e.g. polymers from mass polymerisation processes, generally show a more uniformly porous structure, higher purity, faster plasticiser absorption rates, a shorter drying time, faster flow rates in the form of dry-blends, and improved transparency in moulded articles compared with polymers produced by conventional suspension processes.

An object of the present invention is to provide a suspension process for the production of vinyl halide polymers which are characterised by the partial or total absence of the "pericellular membrane" or external "skin" from around the polymer particles.

Accordingly the present invention is a process for the aqueous suspension polymerisation of a vinyl halide or copolymerisation of such a halide with less than 30% of a copolymerisable monomer which comprises polymerising the monomeric material in aqueous suspension in the presence of a free-radical initiator and a suspension stabiliser comprising a sparingly soluble inorganic phosphate suspending agent and a metal alkyl phosphate extender.

Any polymerisable vinyl halide can be employed in the process of the present invention. The process is particularly suited for the polymerisation and copolymerization of vinyl chloride.

The monomeric material to water ratio is not critical provided sufficient water is present to allow the material to be dispersed therein. Preferably the ratio is in the range from 1:1 to 1:2.5.

Any suitable comonomer, which can be another vinyl halide, can be used. Examples of such comonomers include, but are not restricted to ethylene, propylene, isobutene, 1,2-dichloroethylene, trichloroethylene, vinylidene chloride, vinyl acetate, vinyl laurate, vinyl stearate, alkyl vinyl ethers, acrylic acid esters and substituted acrylic acid esters.

Suitable initiators include lauroyl peroxide, caprylyl peroxide, benzoyl peroxide, tertiary butyl peroxyprivalate and 2-azo-bisisobutyronitrile; peroxydicarbonates such as ditertiarybutylcyclohexylperoxydicarbonate, diethylperoxydicarbonate, dicyclohexylperoxydicarbonate and diisopropyl peroxydicarbonate. Other suitable initiators include those which are formed in situ, that is, in the polymerisation medium, for example the initiator formed by the reaction of a chloroformate ester such as ethylchloroformate or isopropylchloroformate and hydrogen peroxide under alkaline conditions.

The proportion of initiator used in the polymerisation process of the present invention is similar to that used in conventional aqueous suspension polymerisation processes.

Suspending agents which are suitably used in the process of the present invention include sparingly soluble inorganic phosphates such as calcium, strontium, barium, magnesium, aluminium and zinc phosphates. Particularly suitable are phosphates having an apatite structure, for example the hydroxy-apatites. Hydroxy-apatite (calcium hydroxy phosphate) is particularly preferred.

The amount of the inorganic phosphate suspending agent employed may be in the range 0.01 to 1% and is preferably between 0.05 and 0.2% on the weight of monomeric material.

It is sometimes advantageous to use in conjunction with the inorganic phosphate/metal alkyl phosphate system a minor proportion of an organic suspending agent. By "minor proportion" we mean that the total suspending agent contains less than 50% of the organic suspending agent. Examples of suitable organic suspending agents are cellulose ethers such as methyl cellulose, hydroxypropylmethyl cellulose, hydroxyethyl cellulose, and ethylhydroxyethyl cellulose; polyvinyl alcohol, gelatin and partially hydrolysed polyvinyl acetates.

The inorganic phosphate suspending agents are conveniently prepared in an aqueous medium by the double decomposition of water soluble salts or alternatively by treating the appropriate metal base (for example oxide or hydroxide) with orthophosphoric acid. Examples of suitable water soluble salts containing the required cation are calcium chloride, calcium acetate and calcium nitrate.

Suitable water soluble salts containing the required phosphate anion are for example alkali metal phosphates such as trisodium orthophosphate. The composition and particle size of the inorganic phosphate suspending agent is determined to some extent by the pH at which is is formed. Preferably the precipitation is carried out where the pH is in the range 11.0 to 7.0. It is sometimes advantageous to use a "pH adjuster" to control the pH during the precipitation, an example of a suitable "pH adjuster" being disodium hydrogen phosphate dodecahydrate $$(Na_2HPO_4 \cdot 12H_2O)$$

The temperature at which the inorganic phosphate suspending agents are formed controls their composition and particle size. A wide range of temperatures can be employed for the precipitation. For example it can be carried out when the aqueous medium is at a temperature between 15 and 95° C., and preferably at 70–85° C.

The monomeric material and the extender may be present or absent during the formation of the inorganic phosphate suspending agent.

When the minor proportion of the organic suspending agent is used in the process of the present invention, it may be present during the formation of the inorganic phosphate suspending agent. If an organic suspending agent is present, it preferably has a cloud point temperature above the temperature at which the inorganic phosphate suspending agent is formed. For example, a preferred organic suspending agent used during the formation of the inorganic suspending agent at 75° C. would have a cloud point temperature above 75° C.; an example of an organic suspending agent of this type being the proprietory compound "Methocel 90 HG 100" which has a cloud point temperature of about 90° C.

The hydrocarbon group in the metal alkyl phosphate extender suitably contains from 2 to 20 carbon atoms.

The metallic component of the extender is suitably an alkali or alkaline earth metal. Preferably the metallic component is sodium. Examples of suitable extenders include sodium nonyl phosphate and a mixed sodium isopropyl phosphate.

The concentration of metal alkyl phosphate extender used in the process of the present invention can vary over a wide range, the preferred range being from 0.5 to 0.0005% based on the weight of monomeric material used.

The pH of the polymerisation medium may be maintained within the range from 9.0 to 5.0 pH units by the presence of a suitable "pH adjuster" (for example disodium hydrogen phosphate).

The polymerisation temperature is suitably within the range from 5 to 85° C. and preferably in the range 45 to 70° C.

Conventional suspension polymerisation reaction conditions and apparatus can be used and other materials, for example stearic acid or molecular weight modifiers such as trichloroethylene may be added to the polymerisation mixture.

The polymeric products obtained from the process of the present invention are optionally given a wash with water or dilute acid before undergoing the usual drying procedures to give products of improved transparency compared with conventional suspension resins.

Traces of both water-soluble organic and inorganic suspending agent residues may be removed by washing the polymer was water or dilute acid/water respectively.

The invention is further illustrated by the following examples.

("Methocel 65 HG 50" and "Methocel 90 HG 100" are commercially available grades of hydroxypropyl methyl cellulose, and "Perkadox Y–16" is a commercially available polymerisation initiator which is ditertiarybutylcyclohexylperoxydicarbonate.)

EXAMPLE 1

Preparation of the hydroxy-apatite suspension medium

Trisodium phosphate dodecahydrate (0.44 part) and disodium hydrogen phosphate dodecahydrate (0.26 part) were dissolved in water (183 parts) and sodium nonyl phosphate (0.52 part of 1% aqueous solution at pH 8.7) was added. The pH of the resulting solution was 10.5.

Calcium acetate (0.40 part) was added to the solution which was then stirred for 1 hour at 75° C., during which time the hydroxy-apatite was precipitated from the solution.

Suspension polymerisation

"Perkadox Y–16" (0.3 part) and vinyl chloride (100 parts) were added to the suspension medium at a temperature of 20° C. in a stainless steel reactor. The pH of the medium was 6.9. The reactor was sealed and agitated in a thermostated bath at 50° C. After a polymerisation time of 4 hours, polymer was obtained in a yield of greater than 70%.

The polymer particles when viewed by phase contrast microscopy showed no surface "skin."

EXAMPLE 2

Preparation of the hydroxy-apatite suspension medium

Trisodium phosphate dodecahydrate (0.11 part) and disodium hydrogen phosphate dodecahydrate (0.067 part) were dissolved in water (183 parts) containing sodium nonyl phosphate (0.133 part of a 1% aqueous solution). The resulting solution had a pH of 10.5.

Calcium acetate (0.10 part) was added to the solution which was then stirred at 50° C. for 1 hour during which time the hydroxy-apatite was precipitated from the solution.

Suspension polymerisation

"Methocel 65 HG 50" (0.05 part) was dissolved in the suspension medium at 20° C. and vinyl chloride (100 parts) and "Perkadox Y–16" (0.2 part) added. The pH of the medium was 6.8. The polymerisation was carried out at 50° C. for 5 hours in apparatus similar to that used in Example 1. The yield of polymer was 78%.

The polymer particles showed no surface skin when viewed by phase contrast microscopy.

EXAMPLE 3

Preparation of the hydroxy-apatite suspension medium

The suspension medium was prepared as in Example 2 except that "Methocel 65 HG 50" (0.05 part) was dissolved in the aqueous solution at 50° C. before the addition of the calcium acetate.

Suspension polymerisation

Vinyl chloride (100 parts) and "Perkadox Y–16" (0.2 part) were added to the suspension medium, as prepared above after cooling to 20° C. The pH of the medium was 6.9. The polymerisation was carried out at 50° C. for 5 hours in apparatus similar to that used in Example 1. The yield of polymer was 75%.

The polymer particles showed no surface skin when viewed by phase contrast microscopy.

EXAMPLE 4

Preparation of inorganic phosphate suspending agent

Trisodium phosphate dodecahydrate (0.33 part) and disodium hydrogen phosphate dodecahydrate (0.20 part) were dissolved in water (8.6 parts) containing sodium nonyl phosphate extender (5 parts of 1% solution). The solution was heated with stirring to 75° C. whereupon calcium acetate agitation for 30 minutes, The temperature was maintained with adequate agitation for 30 minutes, after which time precipitation of inorganic phosphate suspending agent was complete.

Suspension polymerisation

Distilled water (172 parts) and inorganic suspending agent were introduced to the polymerisation reactor which was fitted with an anchor-type stirrer. Stearic acid (0.1 part) was added followed by Perkadox Y-16 (0.13 part). The reactor was sealed, pressure-tested with nitrogen, vented, evacuated and vinyl chloride monomer (100 parts) added.

The reactor mixture was heated to 55° C. and maintained thus for 4.5 hours with an agitator speed of 400 r.p.m.

After the reactor pressure has dropped to 100 p.s.i.g. unreacted monomer was vented off and the product was blown down into a collection vessel. The polymer was washed and then dried in an air oven.

The product polymer particles were found by microtone sectioning and examination by phase contrast microscopy to have a partial but very thin "skin."

EXAMPLE 5

As for Example 4 except that calcium chloride (0.27 part) was used in place of calcium acetate.

The level of sodium nonyl phosphate extender was raised to 7.5 parts of 1% solution.

Dicyclohexylperoxydicarbonate (0.10 part) was used in place of Perkadox Y-16 and stearic acid was omitted.

The product was blown down at 80 p.s.i.g. and was given a wash with hydrochloric acid (1.4 parts) and found, by phase contrast microscopy to be free from skin.

EXAMPLE 6

Distilled water (172 parts), trisodium phosphate dodecahydrate (0.22 part), disodium hydrogen phosphate dodecahydrate (0.13 part), sodium nonyl phosphate extender (0.53 part of 1% solution) and borax decahydrate (0.20 part) were added to a polymerisation reactor, which was fitted with an anchor type stirrer.

The reactor was sealed, pressure-tested with nitrogen, vented, evacuated and charged with vinyl chloride monomer (100 parts). The reactor was heated to 70° C., with agitation of the reaction mixture at 350 r.p.m., whereupon calcium acetate (0.18 part) was added as a solution in water (0.72 part) via an addition vessel. This temperature was maintained for 10 minutes and then was reduced to the polymerisation temperature of 55° C. The Perkadox Y-16 initiator (0.14 part) was added, as a dispersion in a small quantity of carbon tetrachloride, via the addition vessel.

The reactor was maintained at 55° C. for 30 minutes after which time a further portion of borax (0.20 part) was charged via the addition vessel. After a further 20 minutes, unreacted monomer was vented off and the product blown down into a collection vessel. The product polymer was washed and then dried in an air oven. The polymer particles were found to be substantially "skin" free.

EXAMPLE 7

Preparation of inorganic phosphate suspending agent

Trisodium phosphate dodecahydrate (0.24 part) was dissolved in water (8.6 parts) containing sodium nonyl phosphate extender (0.5 part of 1% solution). The solution was heated with stirring to 75° C. whereupon calcium chloride (0.16 part) was added. The temperature was maintained with adequate stirring for 30 minutes, after which time precipitation of inorganic phosphate suspending agent was complete.

Suspension polymerisation

Distilled water (172 parts) and Methocel 65 HG 50 (0.7 part of a 5% aqueous solution) were introduced to the polymerisation reactor which was fitted with an anchor type stirrer. Hydrogen peroxide (0.29 part of 20 volume grade) and borax (0.32 part) were charged.

The reactor was sealed, pressure-tested with pure nitrogen, vented, and evacuated. The addition vessel was charged with ethyl chloroformate (0.12 part) and washed through into the polymerisation reactor with vinyl chloride monomer (14 parts). The reactor was stirred at 400 r.p.m. without heating, for 10 minutes to bring about the synthesis of the initiator.

The inorganic phosphate suspending agent was added via the addition vessel and washed through with vinyl chloride monomer (86 parts).

The reactor was heated to 55° C. and maintained thus for 4.5 hours.

At a pressure of 90 p.s.i.g., unreacted monomer was vented off and the product blown down into a collection vessel. The polymer was washed and dried in an air oven. The polymer particles were found to be substantially "skin" free.

EXAMPLE 8

Preparation of inorganic phosphate suspending agent

As for Example 7 except that only 3.6 parts of water was used and Methocel 90 HG 100 (0.025 part) was added just before the calcium chloride.

Suspension polymerisation

Distilled water (172 parts) and inorganic phosphate suspending agent were introduced to the polymerisation vessel. Perkadox Y-16 (0.13 part) was charged.

The reactor was sealed, pressure-tested with pure nitrogen, vented, evacuated and charged with vinyl chloride monomer (100 parts).

The reaction mixture was heated to 55° C. and maintained thus with an agitator speed of 400 r.p.m. After 4.0 hours the pressure had fallen to 100 p.s.i.g. Unreacted monomer was vented off and the product blown down into a collection vessel. The polymer was washed with phosphoric acid (0.72 part), water and dried in an air oven. The polymer particles were found to be substantially skin free.

I claim:

1. In a process for the aqueous suspension polymerization of a vinyl halide or copolymerization of such a halide with less than 30% of a copolymerizable monomer in which the monomeric material is polymerized or copolymerized in aqueous suspension in the persence of a free radical initiator and a suspension stabilizer, the improvement whichc omprises using a suspension stabilizer comprising a sparingly soluble inorganic phosphate suspending agent selected from the group consisting of calcium, strontium, barium, magnesium, aluminum, and zinc phosphate and an alkali- or alkaline-earth metal alkyl phosphate extender.

2. A process according to claim 1 wherein the vinyl halide is vinyl chloride.

3. A process according to claim 1 wherein the free radical initiator is formed in the polymerisation medium.

4. A process according to claim 1 wherein the concentration of inorganic phosphate suspending agent in the polymerisation is in the range 0.05 to 0.2% on the weight of monomeric material.

5. A process according to claim 1 wherein the metal alkyl phosphate extender is a sodium alkyl phosphate extender.

6. A process according to claim 1 wherein the alkyl group of the phosphate extender contains from 2 to 20 carbon atoms.

7. A process according to claim 1 wherein the concentration of metal alkyl phosphate extender is in the range 0.5 to 0.0005% based on the weight of monomeric material used.

8. A process according to claim 1 wherein the extender is sodium nonyl phosphate.

9. A process according to claim 1 wherein a minor proportion of an organic suspending agent is used in the suspension polymerisation.

10. A process according to claim 9 wherein the inorganic phosphate suspending agent is formed in the presence of the organic suspending agent.

11. A process according to claim 10 wherein the organic suspending agent has a cloud point temperature which is above the temperature at which the inorganic phosphate suspending agent is formed.

12. A process according to claim 1 wherein the inorganic phosphate suspending agent is hydroxy-apatite.

13. A process according to claim 1 wherein the inorganic phosphate suspending agent is formed at a temperature in the range 70–85° C.

14. A process according to claim 13 wherein the inorganic phosphate suspending agent is formed in the presence of a minor proportion of a hydroxypropylmethyl cellulose organic suspending agent having a cloud point temperature above 85° C.

15. A process according to claim 1 wherein the inorganic phosphate suspending agent is formed in an aqueous medium having a pH in the range 11.0 to 7.0.

References Cited

UNITED STATES PATENTS

| | | | |
|---|---|---|---|
| 2,559,749 | 7/1951 | Benning | 260—29.6 MP |
| 2,594,913 | 4/1952 | Grim | 260—29.6 MP |
| 2,827,443 | 3/1958 | Rector et al. | 260—17 R |
| 3,297,618 | 1/1967 | Glabisch et al. | 260—29.6 MP |
| 3,468,859 | 9/1969 | Davies | 260—17 R |
| 3,499,850 | 3/1970 | Kinzie | 260—17 R |

WILLIAM H. SHORT, Primary Examiner

L. M. PHYNES, Assistant Examiner

U.S. Cl. X.R.

260—17.4 R, 29.6 MP, 86.3, 87.1, 87.5 C, 87.7, 92.8 W